United States Patent
Zeng et al.

(10) Patent No.: US 11,737,013 B2
(45) Date of Patent: *Aug. 22, 2023

(54) METHOD, TERMINAL DEVICE, AND NETWORK SIDE DEVICE FOR ACCESSING NETWORK SIDE DEVICE

(71) Applicant: HUAWEI TECHNOLOGIES CO., LTD., Shenzhen (CN)

(72) Inventors: Qinghai Zeng, Shanghai (CN); Yada Huang, Shanghai (CN); Jian Zhang, Shenzhen (CN); Lifeng Han, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/120,431

(22) Filed: Sep. 3, 2018

(65) Prior Publication Data

US 2018/0376414 A1   Dec. 27, 2018

Related U.S. Application Data

(63) Continuation of application No. PCT/CN2017/075323, filed on Mar. 1, 2017.

(30) Foreign Application Priority Data

Mar. 3, 2016  (CN) .......................... 201610120649.6

(51) Int. Cl.
*H04W 48/18*   (2009.01)
*H04W 8/02*   (2009.01)

(52) U.S. Cl.
CPC ............. *H04W 48/18* (2013.01); *H04W 8/02* (2013.01)

(58) Field of Classification Search
CPC ..... H04W 48/00; H04W 48/16; H04W 48/18; H04W 8/00; H04W 8/005; H04W 8/02;
(Continued)

(56) References Cited

U.S. PATENT DOCUMENTS 7,598,766 B2    10/2009  Mercaldi-Kim et al.
9,155,033 B2 *  10/2015  Buckley ................ H04W 48/18
(Continued)

FOREIGN PATENT DOCUMENTS

| CN | 103269282 A | 8/2013 |
| CN | 103650437 A | 3/2014 |
| CN | 104081719 A | 10/2014 |

OTHER PUBLICATIONS

RPa-160048 SK Telecom,"End-to-End Network Slicing Requirements for Next GenerationAccess Technologies",3GPP TSG RAN ad-hoc,Jan. 281h-291h, 2016—Barcelona, Spain,total 3 pages.
(Continued)

*Primary Examiner* — Peter Chen
(74) *Attorney, Agent, or Firm* — Huawei Technologies Co., Ltd.

(57) ABSTRACT

A communication method includes: receiving, by a terminal device, sub-network information of a RAN sent by a network side device, where the sub-network information is used to indicate at least one RAN sub-network included in the RAN; accessing, by the terminal device, a target RAN sub-network among the at least one RAN sub-network based on a service requirement of the terminal device; and communicating, by the terminal device, with the network side device by using the target RAN sub-network.

4 Claims, 7 Drawing Sheets

(58) Field of Classification Search
CPC ........... H04W 8/04; H04W 8/06; H04W 8/08; H04W 8/18; H04W 76/10; H04W 76/12; H04W 76/27; H04W 36/14; H04W 84/042
See application file for complete search history.

(56) References Cited

U.S. PATENT DOCUMENTS

| | | | |
|---|---|---|---|
| 2013/0035064 A1* | 2/2013 | Balachandran | H04W 48/02 455/411 |
| 2014/0269295 A1 | 9/2014 | Anumala | |
| 2016/0006623 A1 | 1/2016 | Liu et al. | |
| 2017/0079059 A1* | 3/2017 | Li | H04W 16/02 |
| 2018/0249513 A1 | 8/2018 | Chang et al. | |
| 2018/0352501 A1* | 12/2018 | Zhang | H04W 48/18 |
| 2018/0359044 A1* | 12/2018 | Pirskanen | H04J 11/0069 |
| 2019/0014515 A1 | 1/2019 | Zee et al. | |
| 2019/0028941 A1* | 1/2019 | Zee | H04W 36/32 |
| 2019/0037531 A1 | 1/2019 | Pantus et al. | |

OTHER PUBLICATIONS

S2-161081 China Mobile,"Solutionsfor Key Issue 1 (Support of Network Slicing)",SA WG2 Meeting#113AH,Feb. 23-26, 2016, Sophia Antipolis, France,total 5 pages.
S2-161018 Huawei et al.,"Solutionsfor key issue 1—Support of Network Slicing",SA WG2 Meeting #113AH,Feb. 23-26, 2016, Sophia Antipolis, France,total 4 pages.
S2-161326 Nokia Networks et al.,"Solution: Network Slicing",SA WG2 Meeting#S2-113ah,Feb. 23-26, 2016, Sophia Antipolis, FR,total 4 pages.

* cited by examiner

METHOD, TERMINAL DEVICE, AND NETWORK SIDE DEVICE FOR ACCESSING NETWORK SIDE DEVICE

CROSS-REFERENCE TO RELATED APPLICATIONS

This application is a continuation of International Application No. PCT/CN2017/075323, filed on Mar. 1, 2017, which claims priority to Chinese Patent Application No. 201610120649.6, filed on Mar. 3, 2016. The disclosures of the aforementioned applications are hereby incorporated by reference in their entireties.

TECHNICAL FIELD

This application relates to the field of wireless communications, and in specific, to a method for configuring a radio access network (RAN) sub-network, a slice controller, a communication method in a RAN, a terminal device, and a network side device.

BACKGROUND

With development of communications technologies, a communications network is to support more diversified service requirements and scenarios, and to be further abstracted into network slices based on logical functions. A network slice is a combination of logical network functions supporting a communication service requirement of a specific use case. For example, in a network of the 3rd generation mobile communication (The 3rd Generation, 3G) and a network of the 5th generation mobile communication (The 5th Generation, 5G), an enhanced mobile broadband (enhanced Mobile BroadBand, eMBB) network slice, a massive machine type communication (mMTC) network slice, an ultra reliable machine type communication (, uMTC) network slice, or the like may be customized based on service requirements. In a communications network including network slices, a terminal may be guided to a selected network slice to operate to satisfy a requirement of an operator or a user.

Such network structure allows an operator to provide a network as a service to a user, and physical network entities may be freely combined based on indicators such as rate, capacity, coverage, delay, reliability, security, and availability, thereby satisfying requirements of different users.

So far, the prior art has provided only the concept and a model of network slicing, but is lack of specific implementation methods for network slicing, for example, how a RAN sub-network (Radio Access Sub-Network, RASN) forming a network slice is configured, how a terminal device communicates with the RAN sub-network after the RAN sub-network is configured, and so on.

SUMMARY

This application provides a method for configuring a RAN sub-network, a slice controller, and a communication method for communication between a terminal device and a network side device in a RAN by using a RAN sub-network, so as to configure a RAN sub-network and implement communication between a terminal device and a network side device by using a RAN sub-network.

According to a first aspect, a method for configuring a RAN sub-network is provided, including: receiving, by a slice controller, a request message, where the request message is used to request the slice controller to configure a first RAN sub-network satisfying a target communication service requirement; determining, by the slice controller based on the target communication service requirement, at least one protocol function and air interface format that correspond to the first RAN sub-network; allocating, by the slice controller, radio resources to the first RAN sub-network based on the target communication service requirement; and configuring, by the slice controller, the first RAN sub-network based on the at least one protocol function and air interface format, and the radio resources.

In the technical solution of this application, the slice controller configures the RAN sub-network that includes the protocol function, the air interface format, and the radio resources, so that subsequent communication related to the RAN sub-network can be implemented.

In a possible implementation, the determining, by the slice controller based on the target communication service requirement, at least one protocol function and air interface format that correspond to the first RAN sub-network includes: selecting, by the slice controller, a target protocol function applicable to the target communication service requirement from a plurality of candidate protocol functions; selecting, by the slice controller, a target air interface format applicable to the target communication service requirement from a plurality of candidate air interface formats; and determining, by the slice controller, the target protocol function and the target air interface format as the at least one protocol function and air interface format that correspond to the first RAN sub-network.

In the technical solution of this application, a plurality of protocol functions and a plurality of air interface formats are defined in a RAN, and the slice controller may directly select, based on a predefined policy or algorithm, a protocol function and an air interface format that can satisfy a service requirement from these protocol functions and these air interface formats, so as to improve efficiency and convenience of configuring a RAN sub-network.

In a possible implementation, the first RAN sub-network is any one of a plurality of RAN sub-networks configured by the slice controller, and the radio resources of the first RAN sub-network include radio resources exclusively occupied by the first RAN sub-network and radio resources shared by the first RAN sub-network and another one of the plurality of RAN sub-networks.

In the technical solution of this application, the first RAN sub-network configured by the slice controller and another RAN sub-network share some radio resources, so that different RAN sub-networks may perform communication by using a public signal included in the shared radio resources, to improve resource utilization.

In a possible implementation, the radio resources of the first RAN sub-network are all radio resources exclusively occupied by the first RAN sub-network. This ensures that the radio resources exclusively occupied by the first RAN sub-network are not preempted by another RAN sub-network, and a basic communication service of the first RAN sub-network can be guaranteed.

In a possible implementation, the first RAN sub-network is any one of a plurality of RAN sub-networks configured by the slice controller, and the first RAN sub-network and another one of the plurality of RAN sub-networks share a scheduling function in the at least one protocol function of the first RAN sub-network.

In the technical solution of this application, in addition to possessing the protocol function of the first RAN sub-network, the first RAN sub-network also shares a scheduling function with another RAN sub-network. Therefore, resources can be allocated more flexibly between different RAN sub-networks.

In a possible implementation, the first RAN sub-network and another sub-network in the plurality of RAN sub-networks correspond to a same CN sub-network in a core network (Core Network, CN), and the first RAN sub-network, the another sub-network in the plurality of RAN sub-networks, and the CN sub-network form a network slice satisfying the target communication service requirement.

In the technical solution of this application, the CN sub-network can achieve a purpose such as improving capacity, efficiency, or reliability by using resources of different RAN sub-networks. For example, one RAN sub-network provides resources on a high-frequency spectrum, one RAN sub-network provides resources on a low-frequency spectrum, and the CN sub-network may communicate with terminals by using these two sub-networks.

In a possible implementation, the first RAN sub-network corresponds to one or more CN sub-networks in a CN, and the first RAN sub-network and the one or more CN sub-networks form a network slice satisfying the target communication service requirement.

In the technical solution of this application, a plurality of CN sub-networks share a RAN sub-network, radio resource utilization may be improved, and radio resources of the RAN sub-network are dynamically allocated based on requirements of the plurality of CN sub-networks on radio resources.

In a possible implementation, the method further includes: adjusting, by the slice controller based on a usage status of the radio resources of the first RAN sub-network or a change in the target communication service requirement, at least one of the protocol function, the air interface format, and the radio resources that correspond to the first RAN sub-network.

The slice controller adjusts the RAN sub-network, and resource utilization of the RAN can be improved.

In a possible implementation, the slice controller receives status information of a network slice consisting of the first RAN sub-network sent by the CN, where the adjusting, by the slice controller based on a usage status of the radio resources of the first RAN sub-network or a change in the target communication service requirement, at least one of the protocol function, the air interface format, and the radio resources that correspond to the first RAN sub-network includes: adjusting, by the slice controller based on the status information and the usage status of the radio resources of the first RAN sub-network or the change in the target communication service requirement, at least one of the protocol function, the air interface format, and the radio resources that correspond to the first RAN sub-network.

In the technical solution of this application, in addition to the usage status of the radio resources of the first RAN sub-network or the change in the target communication service requirement, the slice controller may adjust the first RAN sub-network also based on the status information sent by the CN. In this way, the status of the network slice corresponding to the first RAN sub-network is taken into consideration, and the first RAN sub-network more can be adjusted more flexibly.

In a possible implementation, the method further includes: sending, by the slice controller, information about the at least one protocol function and air interface format, and the radio resources that correspond to the first RAN sub-network.

In the technical solution of this application, after configuring the first RAN sub-network, the slice controller sends information about the first RAN sub-network, for example, to the terminal device or a network side device such as a RAN access point, so that communication related to the RAN sub-network can be implemented between the terminal device and the network side device.

According to a second aspect, a communication method is provided, including: receiving, by a terminal device, sub-network information of a RAN sent by a network side device, where the sub-network information is used to indicate at least one RAN sub-network included in the RAN; accessing, by the terminal device, a target RAN sub-network among the at least one RAN sub-network based on a service requirement of the terminal device; and communicating, by the terminal device, with the network side device by using the target RAN sub-network.

In the technical solution of this application, communication between a terminal device and a network side device can be implemented by using a RAN sub-network.

In a possible implementation, the accessing, by the terminal device, a target RAN sub-network among the at least one RAN sub-network based on a service requirement of the terminal device includes: determining, by the terminal device, the target RAN sub-network based on the service requirement; accessing, by the terminal device, a public RAN sub-network among the at least one RAN sub-network; and redirecting, by the terminal device, to the target RAN sub-network from the public RAN sub-network.

In the technical solution of this application, when accessing the target RAN sub-network, the terminal device first accesses the public RAN sub-network, and then redirects to the target RAN sub-network from the public RAN sub-network. That is, the terminal device may first access a RAN by using a public signal, and then access the target RAN sub-network by using a dedicated signal, so as to improve utilization of the public RAN.

In a possible implementation, the accessing, by the terminal device, a target RAN sub-network among the at least one RAN sub-network based on a service requirement of the terminal device includes: determining, by the terminal device, the target RAN sub-network based on the service requirement; detecting, by the terminal device, a synchronization signal of the target RAN sub-network; and accessing, by the terminal device, the target RAN sub-network based on the synchronization signal.

In the technical solution of this application, even when the target RAN sub-network has no public signal or public RAN sub-network, access to the target RAN sub-network can still be implemented.

In a possible implementation, the sub-network information includes at least one of the following information of each of the at least one RAN sub-network: information about a supported public land mobile network (Public Land Mobile Network, PLMN), a supported service type, information about a PLMN supported by a neighboring RAN sub-network, and a service type supported by the neighboring RAN sub-network.

In the technical solution of this application, the terminal device may determine the to-be-accessed target RAN sub-network more flexibly based on the PLMN information or the service type supported by the RAN sub-network, or the PLMN information or the service type supported by the neighboring RAN sub-network.

In a possible implementation, the target RAN sub-network includes a plurality of RAN sub-networks, the plurality of RAN sub-networks respectively belong to a plurality of network slices, and the plurality of network slices use a uniform mobility management manner for the terminal device, to reduce complexity of mobility management.

According to a third aspect, a communication method is provided, including: sending, by a network side device, sub-network information of a RAN to a terminal device, where the sub-network information is used to indicate at least one RAN sub-network included in the RAN; connecting, by the network side device, the terminal device to a target RAN sub-network among the at least one RAN sub-network, where the target RAN sub-network is selected based on a service requirement of the terminal device; and communicating, by the network side device, with the terminal device by using the target RAN sub-network.

In the technical solution of this application, communication between a terminal device and a network side device can be implemented by using a RAN sub-network.

In a possible implementation, the connecting, by the network side device, the terminal device to a target RAN sub-network among the at least one RAN sub-network includes: connecting, by the network side device, the terminal device to a public RAN sub-network among the at least one RAN sub-network, and obtaining information about the target RAN sub-network from the terminal device; and redirecting, by the network side device based on the information about the target RAN sub-network, the terminal device to the target RAN sub-network from the public RAN sub-network.

In a possible implementation, the communication method further includes: when the service requirement of the terminal device or a RAN sub-network that the terminal device intends to access changes, redirecting, by the network side device, the terminal device to a new RAN sub-network.

In a possible implementation, the sub-network information includes at least one of the following information of each of the at least one RAN sub-network: information about a supported PLMN, a supported service type, information about a PLMN supported by a neighboring RAN sub-network, and a service type supported by the neighboring RAN sub-network.

In a possible implementation, the target RAN sub-network includes a plurality of RAN sub-networks, the plurality of RAN sub-networks respectively belong to a plurality of network slices, and the plurality of network slices use a uniform mobility management manner for the terminal device.

According to a fourth aspect, a slice controller is provided, where the slice controller includes a unit configured to perform the method according to the first aspect.

According to a fifth aspect, a terminal device is provided, where the terminal device includes a unit configured to perform the method according to the second aspect.

According to a sixth aspect, a network side device is provided, where the network side device includes a unit configured to perform the method according to the third aspect.

According to a seventh aspect, a slice controller is provided, where the slice controller includes a memory, a processor, and a transceiver. The memory is configured to store a program, and the transceiver is configured to communicate with another network device. When the program in the memory is executed, the processor performs the method according to the first aspect.

According to an eighth aspect, a terminal device is provided, where the terminal device includes a memory, a processor, and a transceiver. The memory is configured to store a program, and the transceiver is configured to communicate with a network side device. When the program in the memory is executed, the processor performs the method according to the second aspect.

According to a ninth aspect, a network side device is provided, where the network side device includes a memory, a processor, and a transceiver. The memory is configured to store a program, and the transceiver is configured to communicate with a terminal device. When the program in the memory is executed, the processor performs the method according to the third aspect.

According to a tenth aspect, a communications system is provided, including the slice controller based on the fourth aspect.

According to an eleventh aspect, a communications system is provided, including the terminal device according to the fifth aspect and the network side device according to the sixth aspect.

According to a twelfth aspect, a system chip is provided, including an input interface, an output interface, at least one processor, and a memory. The input interface, the output interface, the processor, and the memory are connected to each other by using a bus, the processor is configured to execute code in the memory, and when the code is executed, the processor implements the method according to the first aspect.

According to a thirteenth aspect, a system chip is provided, including an input interface, an output interface, at least one processor, and a memory. The input interface, the output interface, the processor, and the memory are connected to each other by using a bus, the processor is configured to execute code in the memory, and when the code is executed, the processor invokes the input interface and the output interface to implement the method according to the second aspect.

According to a fourteenth aspect, a system chip is provided, including an input interface, an output interface, at least one processor, and a memory. The input interface, the output interface, the processor, and the memory are connected to each other by using a bus, the processor is configured to execute code in the memory, and when the code is executed, the processor invokes the input interface and the output interface to implement the method according to the third aspect.

According to a fifteenth aspect, a computer readable medium is provided, the computer readable medium stores program code used to be executed by a slice controller, and the program code includes an instruction used to perform the method according to the first aspect.

According to a sixteenth aspect, a computer readable medium is provided, the computer readable medium stores program code used to be executed by a terminal device, and the program code includes an instruction used to perform the method according to the second aspect.

According to a seventeenth aspect, a computer readable medium is provided, the computer readable medium stores program code used to be executed by a network side device, and the program code includes an instruction used to perform the method according to the third aspect.

DESCRIPTION OF EMBODIMENTS

For convenience of understanding, an example diagram of a system architecture that can implement the RAN access method in the embodiments of this application is described first generally. It should be understood that, the embodiments of this application are not limited to the system architecture shown in FIG. 1. Moreover, an apparatus in FIG. 1 may be hardware, or may be software based on functional division or a structure of the foregoing hardware and software.

Figure 1:
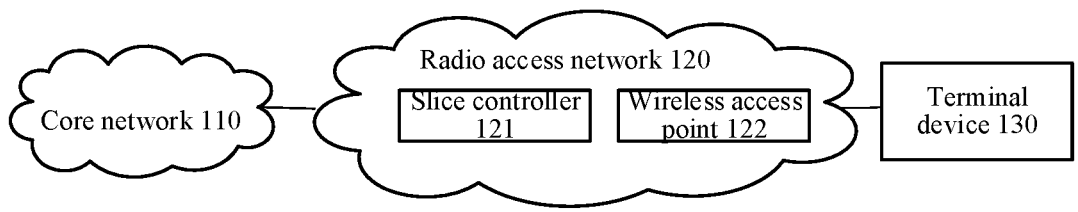
FIG. 1 is a schematic structural diagram of a system according to an embodiment of this application.

In the system shown in FIG. 1, a network is further abstracted into network slices (Network Slice) based on logical functions, where the slices are constructed in a form of "customized function+generalized hardware". A network slice implemented based on customized software allows an operator to provide a network as a service to a user. That is, the operator can provide a connectivity service to the user by using a physical network in a form of 'network as service', and freely and flexibly combine network performance indicators such as rate, capacity, coverage, delay, reliability, security, and availability, thereby satisfying specific requirements of each use case.

In the system shown in FIG. 1, an SDN technology and an NFV technology may be combined, so that the operator may provide customized network slices to different types of communication users on a same infrastructure. For example, the operator provides a mobility management entity (MME) network slice to a mobile broadband user, and provides a machine type communication (MTC) network slice for machine type communication. All the network slices are run on a same hardware platform, but respective functions are defined by customized software, may be optimized and configured based on types and characteristics of users, and are isolated from each another. The operator may flexibly and elastically configure these network slices in real time and dynamically control these network slices, thereby creating innovative services having real-time performance, and improving efficiency of network and IT resources.

Normally, the system shown in FIG. 1 may create independent network slices (which may also be referred to as network slice instances) for different services or different tenants (such as virtual network operators (Mobile Virtual Network Operator, MVNO)), where the network slices may include a CN sub-network (which may also be referred to as a CN sub-network instance, a CN slice instance, or a CN slice) and a RAN sub-network (which may also be referred to as a RAN sub-network instance, a RAN slice instance, or a RAN slice). Then, a terminal device may access these network slices to perform communication. The CN sub-network may also be referred to as a service slice (Service Slice) instance, and a core network 110 manages or performs an operation related to the CN sub-network. An operation related to the RAN sub-network is managed or performed by a slice controller 121 in a radio access network 120 (or a slice controller independently deployed outside a RAN), and the slice controller may be a functional module or a network element mainly responsible for configuration functions of the RAN sub-network, such as creation, deletion, and modification, and may configure a protocol function, an air interface format, a protocol parameter, or the like. The network slice is a logical network that provides a specific function and/or specific (baseline) performance for a specific service, and the network slice is characterized by a life cycle, for example, available only in specific time or space and/or for a specific tenant, and includes at least two attributes: function and resource.

The system architecture shown in FIG. 1 includes the core network 110, the radio access network 120, and the terminal device 130. The radio access network 120 includes the slice controller 121 and a wireless access point 122. It should be noted that, a system to which this embodiment of this application is applied may further include more or less components than those of the system shown in FIG. 1.

The core network 110 has functions such as mobility management anchoring, CN sub-network management, management of a mapping relationship between CN sub-networks and RAN sub-networks, end-to-end slice connection management jointly with the slice controller of the RAN, session (session) management, and mobility management. The core network 110 communicates with the terminal device 130 by using the radio access network 120.

The slice controller 121 has functions such as RAN sub-network protocol configuration, resource allocation, topology management, inter-slice coordination and interoperation, management of a mapping between RAN sub-networks and CN sub-networks, connection management related to Radio Resource Control (Radio Resource Control, RRC), mobility management, and system information. The slice controller 121 may further provide a service to the outside or the like by using an application interface (Application Interface, API). The slice controller 121 may also be named, for example, a RAN sub-network controller or a RAN controller.

The slice controller 121 shown in FIG. 1 as a base station or a logical function entity in a network element of an access network is deployed in the RAN, but the slice controller 121 may be deployed as an independent network element, or may be deployed together with a CN control plane function such as a CN sub-network controller, or together with a network slice controller. For example, the network slice controller includes functions such as a CN sub-network controller and a RAN sub-network controller. The slice controller 121 includes physical and logical attributes such as logical functions, computing resources, storage resources, and transmission resources. In a scenario of a cloud radio access network (cloud RAN), the slice controller 121 may be deployed at a baseband unit (BBU), or slice controllers are deployed at a BBU and a remote radio unit (RRU) in a distributed manner. The BBU and the RRU herein are network elements of a radio access network that support flexible protocol stack layering. Some or all of protocol layers such as an RRC protocol layer, a packet data convergence protocol (PDCP) protocol layer, a radio link control (RLC) protocol layer, a media access control (MAC) protocol layer, and a physical layer (PHY) protocol layer of a radio interface protocol may be separately located in the BBU or the RRU, and protocol layers distributed in the BBU and the RRU jointly form a complete radio interface protocol stack. When multiple hops of network nodes form the radio access network 120, for example, in a scenario in which a relay (Relay) is included, the slice controller 121 may be located at a donor eNB (Donor eNB, DeNB), or slice controllers are distributed at a DeNB and the relay node.

The terminal device 130 may access the radio access network 120 by using the wireless access point 122.

The terminal device 130 may communicate with one or more core networks by using the radio access network 120, and the terminal device may be referred to as an access terminal, user equipment (User Equipment, UE), a user unit, a user station, a mobile site, a mobile station, a remote station, a remote terminal, a mobile device, a user terminal, a terminal, a wireless communications device, a user proxy, or a user apparatus. The terminal device may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, or a terminal device in a future 5G network.

The system architecture shown in FIG. 1 may be applied to, without being limited to, a 5G communications system, a Long Term Evolution (Long Term Evolution, LTE) communications system, or a further evolved system of an LTE communications system.

Figure 2:
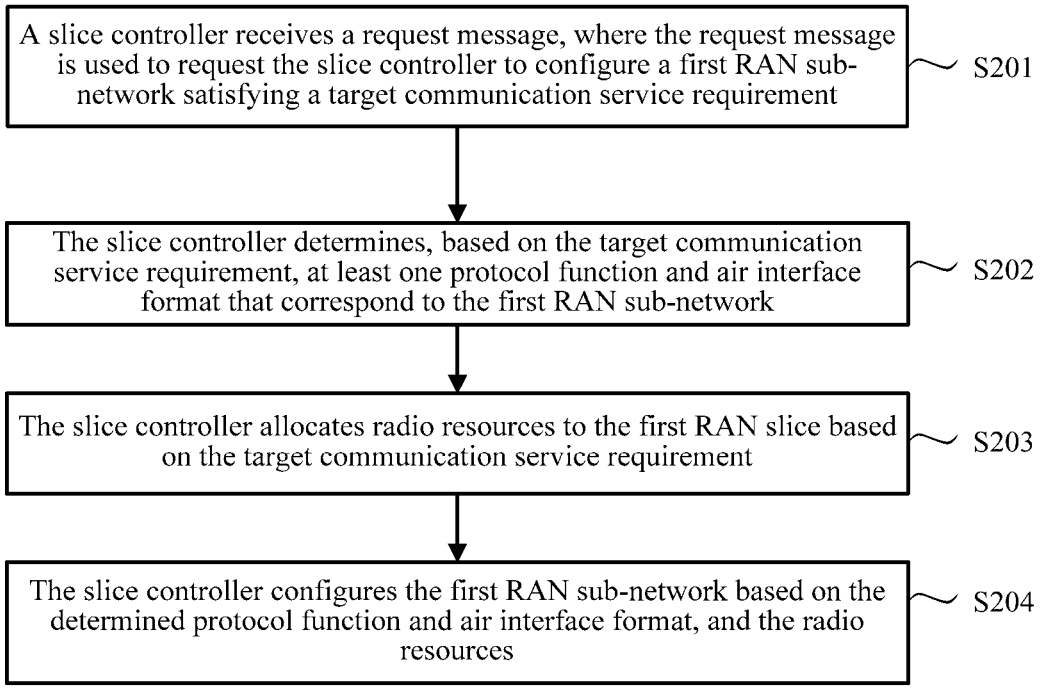
FIG. 2 is a schematic flowchart of a method for configuring a RAN sub-network according to an embodiment of this application.

A method for configuring a RAN sub-network according to an embodiment of this application is first described below with reference to FIG. 2. A slice controller executing the method may be the slice controller 121 in FIG. 1. Alternatively, when the slice controller 121 is located in a RAN, the method may be executed by the RAN; and when the slice controller 121 is deployed as an independent network element, the method may be executed by the independent network element.

S201. A slice controller receives a request message, where the request message is used to request the slice controller to configure a first RAN sub-network satisfying a target communication service requirement.

S202. The slice controller determines, based on the target communication service requirement, at least one protocol function and air interface format that correspond to the first RAN sub-network.

S203. The slice controller allocates radio resources to the first RAN sub-network based on the target communication service requirement.

S204. The slice controller configures the first RAN sub-network based on the determined protocol function and air interface format, and the radio resources.

In the technical solution of this embodiment of this application, when receiving a request message, the slice controller determines one or more protocol functions and one or more air interface formats, and allocates radio resources, and therefore may configure, based on these protocol functions, air interface formats, and radio resources, a RAN sub-network satisfying a service requirement. The configuration in this embodiment of this application may be an action such as creation, modification (reconfiguration), or deletion, and may be a parameter configuration that is applicable to all functions or modules, or some functions or modules of the RAN sub-network, or the foregoing functions or modules.

The slice controller may receive the request message from a CN or an operations, administration and maintenance (OAM) system, another system or network, or a terminal device, or the slice controller may determine, based on a requirement, to configure the first RAN sub-network satisfying the target communication service requirement. This is not limited in this application. The request message sent by the CN or the OAM system to the slice controller may include one or more pieces of information such as a service feature, a quantity of needed resources, geographic area distribution, a time length, whether a resource needs hard guarantee, and a mobility requirement. After receiving the request message, the slice controller may configure a RAN sub-network based on the information included in the request message.

The request message sent by the CN or the OAM system to the slice controller may request the slice controller to create a new RAN sub-network, delete an existing RAN sub-network, or reconfigure functions or parameters of one or more existing RAN sub-networks, or the foregoing plurality of operations are included. The slice controller may determine, by using an acceptance control function, whether to accept the request message, and respond with a rejection or success message based on an execution result. When a new RAN sub-network is created or a RAN sub-network is reconfigured, the slice controller may need to re-allocate resources for the RAN sub-network, for example, obtaining the resources from resources of an existing RAN sub-network such as a public RAN sub-network, or adding new resources; or when a RAN sub-network is deleted, resources occupied by the deleted RAN sub-network may be released and re-allocated to another RAN sub-network.

A RAN sub-network may be considered as an access network sub-network including specific RAN functions (that is, protocol functions such as a control plane protocol function and/or a user plane protocol function), specific logical radio resources (that is, specific air interface formats such as a waveform, a multiple access manner, a frame structure, and a numerology), and radio resources of specific homing characteristics (such as radio resources of a same frequency, different frequencies, a same carrier, and different carriers) within a range of an access network (such as an eNB, where there is an independent S1 interface between the eNB and the CN). Therefore, the access network sub-network may also be referred to as a RAN sub-network. For example, the slice controller may create or reconfigure one or more of various forms such as a RAN sub-network supporting enhanced mobile broadband, a RAN sub-network supporting massive machine type communication, a RAN sub-network supporting high reliable and low delay communication, connection-based a RAN sub-network, a connectionless RAN sub-network, and a broadcast-based RAN sub-network. The slice controller of the RAN may also create a RAN sub-network for a virtual network operator or a third party. For example, an operator A creates a RAN sub-network for an operator B in a network of the operator A, and the RAN sub-network is configured to connect users of the operator B, and perform a function specific to the operator B. A plurality of RAN sub-networks may possess a public function such as an access function that is used by all users or a plurality of users to access a system; and the RAN sub-networks further possess respective specific control plane functions and user plane functions.

In an independent access network, different RAN functions (that is, protocol functions), different air interface (Air Interface, AI) formats, and differently homed radio resources form different RAN sub-networks. The AI formats may be different resource grids (resource grid) generated based on different designs such as a waveform, a multiple access manner, a frame structure, and a numerology, may be protocol stacks including a physical layer and a media access control (MAC) layer, or may be protocol stacks including a physical layer, a MAC layer, and another higher protocol stack such as a Radio Link Control (RLC, radio link control) layer and/or a Packet Data Convergence Protocol (PDCP, packet data convergence protocol) layer. A coupling relationship may exist between the protocol functions and the AI formats to an extent. This is not limited in this application. However, some RAN functions and some AI formats probably do not match and hence do not form a valid RAN sub-network instance. Generally, different protocol functions but a same AI format; a same protocol function but different AI formats; and a same protocol function and a same AI format but different radio resources, all form different RAN sub-networks.

Normally, the RAN stores one or more of templates including a service attribute template, an air interface format template, and a protocol function template that are predefined. Information recorded in the service attribute template may include quality of service (Quality of Service, QoS) information of a plurality of services. Information recorded in the air interface format template may include information such as waveforms, multiple access information, and frame structures that correspond to a plurality of air interface formats. Information recorded in the protocol function template may include information about a plurality of protocol functions, such as an RRC protocol layer, a PDCP protocol layer, an RLC protocol layer, a MAC protocol layer, and a PHY protocol layer, specific functions included by the protocol layers, such as encryption, integrity protection, automatic repeat request (ARQ), hybrid automatic repeat request (Hybrid ARQ), multiplexing/demultiplexing, scheduling, and resource allocation. Protocol function templates may be combined by using a protocol layer as a granularity or by using each functional module or functional element in a protocol layer as a granularity, so that the slice controller may customize a target air interface format and a target protocol function on demand.

In this case, a specific implementation in which the slice controller determines, based on the target communication service requirement, the protocol function and the air interface format that correspond to the first RAN sub-network may be: the slice controller selects a target protocol function applicable to the target communication service requirement from a plurality of candidate protocol functions, and selects a target air interface format applicable to the target communication service requirement from a plurality of candidate air interface formats.

For example, the candidate protocol functions include a protocol function in which a protocol layer is used as a granularity, such as a PDCP protocol and an RLC layer protocol that are used for a mobile broadband service, and a PDCP protocol and an RLC protocol that are used for massive machine communication, and when creating a RAN sub-network of a mobile broadband type based on a service requirement, the slice controller selects a candidate protocol of a mobile broadband service. The candidate protocol functions may also be performed based on functional units in the protocol layers, such as an RLC AM functional unit applicable to a mobile broadband service, and an RLC AM functional unit applicable to massive machine communication, and the slice controller selects various functional units based on a service type corresponding to a RAN sub-network to form a complete protocol function. Correspondingly, the candidate air interface formats may also be configured or selected based on the foregoing similar method, and then the slice controller determines the target protocol function and the target air interface format as the protocol function and the air interface format that correspond to the first RAN sub-network.

When the RAN stores a predefined policy or radio resource management (Radio Resource Management, RRM) algorithm, the slice controller may further specifically select, based on the predefined policy or RRM algorithm, the target protocol function and the target air interface format that satisfy the target communication service requirement from the candidate protocol functions and the candidate air interface formats.

When the slice controller is independently deployed, a base station in the RAN needs to report a communication capability of the base station to the slice controller, for example, information such as an air interface format or a protocol function supported by the base station, so that the slice controller configures a RAN sub-network based on the information about the base station.

In this embodiment of this application, in addition to the first RAN sub-network, the slice controller may further configure another RAN sub-network, that is, the first RAN is only one of a plurality of RAN sub-networks configured by the slice controller.

In some application scenarios, the first RAN sub-network and the another RAN sub-network configured by the slice controller may share a scheduling function such as a scheduling function of a MAC layer protocol. In addition to the scheduling function, the first RAN sub-network and the another RAN sub-network may further share one or more of the following functions: functions such as multiplexing/demultiplexing (multiplexing/demultiplexing), random access (random access), HARQ control, and logical channel priority prioritization (logical channel prioritization).

For example, when protocol functions corresponding to each of the first RAN sub-network and the another RAN sub-network include a data link layer (L2 layer), a network layer (L3 layer), a MAC layer, and a physical layer, a scheduling function of the MAC layer in the protocol functions corresponding to the first RAN sub-network may be the same as a scheduling function of the MAC layer in the protocol functions corresponding to the another RAN sub-network, and other protocol functions are different.

If radio resources corresponding to the first RAN sub-network and the another RAN sub-network are different, the first RAN sub-network and the another RAN sub-network are different RAN sub-networks. Certainly, if all protocols in the protocol functions corresponding to the first RAN sub-network and the another RAN sub-network are different and the radio resources corresponding to the first RAN sub-network and the another RAN sub-network are different, the first RAN sub-network and the another RAN sub-network are also different RAN sub-networks.

When the first RAN sub-network and the another RAN sub-network may share a MAC layer protocol of the protocol functions, the first RAN sub-network and the another RAN sub-network may further possess respective MAC layer protocols. In this case, the shared MAC layer protocol may be used to perform mapping between a service bearer and a physical layer, and the mapping may be performed based on an RRC configuration or a shared MAC layer dynamic scheduling decision.

In this embodiment of this application, all radio resources allocated by the slice controller to the first RAN sub-network may be radio resources exclusively occupied by the first RAN sub-network, and the exclusively occupied radio resources cannot be shared with the another RAN sub-network. For example, a RAN sub-network exclusively occupies resources such as a specific synchronization signal, a reference signal, system information, a physical control channel, and a physical shared channel.

The slice controller may further allocate a public (shared) radio resource to the plurality of RAN sub-networks including the first RAN sub-network, that is, the public radio resource is used for communication of a public signal of the plurality of RAN sub-networks. For example, the first RAN sub-network may perform synchronization with the another RAN sub-network by using a synchronization channel on the public resource, receive system information (system information) on the public resource, receive a paging (paging) message, perform RRM related measurement based on a reference signal on the public resource, and so on.

The public (shared) radio resource allocated by the slice controller to the plurality of RAN sub-networks including the first RAN sub-network may be further used for service data communication of one or more RAN sub-networks on demand. For example, the slice controller allocates a radio resource in real time in a dynamic scheduling manner, the radio resource is used for physical shared channels of the plurality of RAN sub-networks, and the physical shared channels include at least a physical downlink shared channel (Physical Downlink Shared Channel, PDSCH), and a physical uplink shared channel (Physical Uplink Shared Channel, PUSCH).

It should be noted that, when the slice controller allocates a public radio resource to the plurality of RAN sub-networks including the first RAN sub-network, the slice controller may further allocate, to slices in the plurality of RAN sub-networks, radio resources exclusively occupied by these slices respectively.

The slice controller may configure different access control functions for different RAN sub-networks, for example, configuring different access category limitations, different cell selection/reselection priorities, different cell selection/reselection parameter configurations, different system information, disclosing functions at different levels or grades for different third-party users, and configuring different priorities for different UEs. In this case, when establishing an RRC connection, UE needs to consider access category limitation information that is broadcast by each RAN sub-network. For example, different RAN sub-networks may respectively broadcast access control information such as "limited", "reserved for operator use", and "not limited".

A radio resource may be shared by a plurality of RAN sub-networks in a manner such as time division multiplexing (, TDM), frequency division multiplexing (FDM), code division multiplexing (CDM), or space division multiplexing (SDM).

The slice controller may further adjust a radio resource allocated to a RAN sub-network, and therefore may properly allocate a radio resource of the RAN. For example, a public radio resource is adjusted in a semi-static manner. The slice controller may further adjust a radio resource of a RAN sub-network based on a usage status of the radio resources of the RAN sub-network, for example, adjusting a cell capacity class value (Cell Capacity Class Value), or adjusting an exclusive resource such as a carrier.

Before the slice controller adjusts radio resources of RAN sub-networks, the RAN sub-networks may report information such as usage statuses of the radio resources of the RAN sub-networks, service experience of a user, and quality of service to the slice controller. The usage statuses of the radio resources may include one or more of a usage status of a radio resource exclusively occupied by a RAN sub-network, a usage status of a shared radio resource, and the like.

The core network may notify the slice controller of requirement change information of a service corresponding to a RAN sub-network, so that the slice controller may adjust a radio resource of the RAN sub-network based on the requirement change information. The requirement change information may include one or more of change information of a radio resource requirement of a network slice including a RAN sub-network, change information of an area of the network slice, and load status information of the network slice, and the like.

For example, radio resource utilization of a RAN sub-network is up to 95%, and radio resource utilization of another RAN sub-network is only 5%. If radio resources required by the core network in the area remain unchanged, the slice controller may allocate more radio resources to the first RAN, and allocate fewer radio resources to the second RAN sub-network, thereby improving resource use efficiency of the RAN while satisfying radio resource requirements of both RAN sub-networks.

If total load of RAN sub-networks in an entire area that are controlled by the slice controller reaches a threshold to enter a high load state, the slice controller needs to report the high-load state of the RAN sub-networks to the core network.

The slice controller may adjust not only radio resources of a RAN sub-network, but also a protocol function and an air interface format of the RAN sub-network. For example, the protocol function of the RAN sub-network is adjusted based on a service requirement change. For example, when interference increases, a corresponding interference management function is enhanced for the RAN sub-network, and when a reliability requirement is raised, an automatic retransmission function is added or a different coding scheme is used. The air interface format of the RAN sub-network may also be adjusted based on a service requirement change. For example, when a delay requirement is raised, a subframe duration is reduced, and when a movement speed of UE is increased or reduced, an adaptive physical layer parameter and the like is used.

In this embodiment of this application, a RAN sub-network configured by the slice controller is a component of a network slice in the system shown in FIG. 1. The RAN sub-network and a corresponding CN sub-network on the core network form a complete network slice, thereby providing a service satisfying the target communication service requirement to the UE.

Among RAN sub-networks generated and configured by the slice controller, one RAN sub-network may correspond to one CN sub-network in the CN, and in this case, the RAN sub-network and the CN sub-network form one network slice; one RAN sub-network may correspond to a plurality of CN sub-networks, and the RAN sub-network and the plurality of CN sub-networks form one network slice, or the one RAN sub-network and any one of the CN sub-networks form one network slice; a plurality of RAN sub-networks correspond to one CN sub-network, and the plurality of RAN sub-networks and the one CN sub-network form one network slice, or any one of the RAN sub-networks and the CN sub-network form one network slice; or a plurality of RAN sub-networks and a plurality of CN slice CN sub-networks form one network slice.

In this embodiment of this application, the slice controller may further add or delete a RAN sub-network in the RAN based on a service requirement of the terminal device or a message sent by the CN or the OAM, or perform another operation on a RAN sub-network, for example, reconfigure one or more of the protocol function, the air interface format, and the radio resources that correspond to a RAN sub-network, and notify or configure information about an updated RAN sub-network in the RAN to the network side device or the terminal device by using, for example, system information or dedicated signaling.

After configuring, reconfiguring, or updating a RAN sub-network, the slice controller may send information about the RAN sub-network to the terminal device or another network device in the RAN, so that the terminal device or the another network device may access the RAN sub-network based on the information about the RAN sub-network.

The method for configuring a RAN sub-network by a slice controller is described above with reference to FIG. 2, and a method for communication between a terminal device and a network side device by using a RAN sub-network after a slice controller configures the RAN sub-network is described below with reference to FIG. 3 and FIG. 4. A network side device may be a base station, a slice controller, a core network, or the like.

Figure 3:
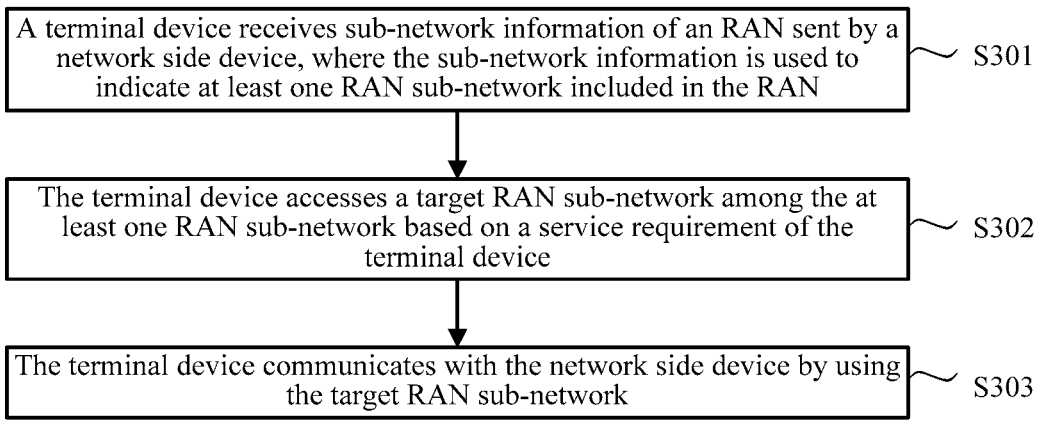
FIG. 3 is a schematic flowchart of a communication method according to an embodiment of this application.

FIG. 3 shows a communication method on a terminal device side.

S301. A terminal device receives sub-network information of a RAN sent by a network side device, where the sub-network information is used to indicate at least one RAN sub-network included in the RAN.

S302. The terminal device accesses a target RAN sub-network among the at least one RAN sub-network based on a service requirement of the terminal device.

S303. The terminal device communicates with the network side device by using the target RAN sub-network.

Figure 4:
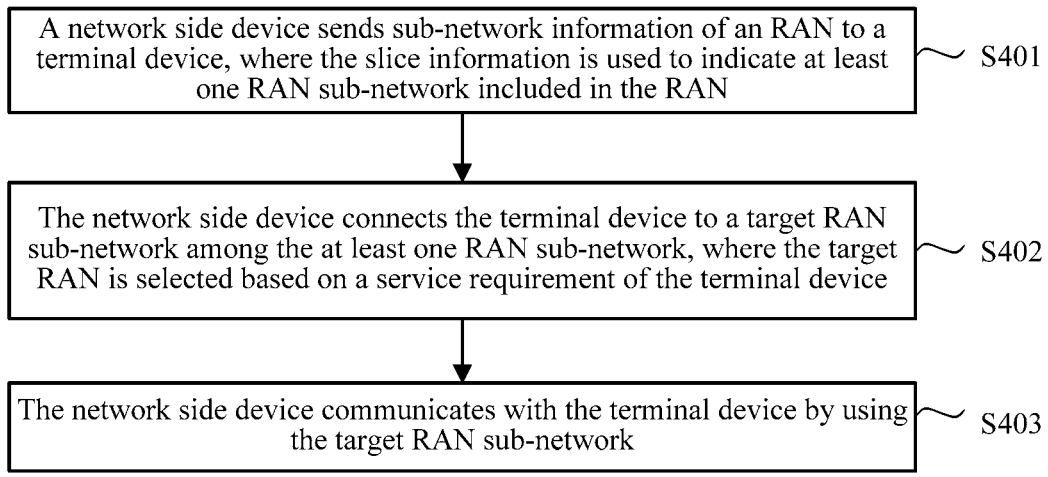
FIG. 4 is a schematic flowchart of a communication method according to an embodiment of this application.

Corresponding to the communication method on the terminal device side shown in FIG. 3, a communication method for a network side device is shown in FIG. 4.

S401. A network side device sends sub-network information of a RAN to a terminal device, where the slice information is used to indicate at least one RAN sub-network included in the RAN.

S402. The network side device connects the terminal device to a target RAN sub-network among the at least one RAN sub-network, where the target RAN is selected based on a service requirement of the terminal device.

S403. The network side device communicates with the terminal device by using the target RAN sub-network.

The method for communication between a terminal device and a network side device in this embodiment of this application enables the terminal device and the network side device in the RAN to communicate by using the RAN sub-network.

In this embodiment of this application, information about a RAN sub-network sent by the network side device to the terminal device may be obtained from the slice controller configuring the RAN sub-network. After the network side device sends the information about the RAN sub-network in the RAN to the terminal device, the terminal device may select the RAN sub-network.

The sub-network information of the RAN sent by the network side device to the terminal device may include at least one of the following information of each of the at least one RAN sub-network: information about a supported PLMN, a supported service type, information about a PLMN supported by a neighboring RAN sub-network, and a service type supported by the neighboring RAN sub-network. Certainly, the sub-network information may also include other information such as a center frequency, a frequency bandwidth, a waveform, a frame structure, a numerology (the numerology is a parameter design related to an aspect such as the waveform or the frame structure), or a multiple access manner of the RAN sub-network. This is not limited in this application.

The network side device may further send information about a RAN sub-network in a neighboring cell to the terminal device, so that the terminal device measures or selects the neighboring cell.

In this embodiment of this application, the terminal device may select a RAN sub-network by adding a new factor based on cell selection/reselection (cell selection/reselection) by a terminal device in the prior art. When the information about the RAN sub-network sent by the network side device to the terminal device includes information about a service supported by the RAN sub-network, new factors may include a service required by the terminal device, and may further include an availability factor of the service, for example, a time period in which the service is used or a geographic location at which the service is used.

When the network side device does not broadcast the information about the service supported by the RAN sub-network, the terminal device may select, based on a RAN sub-network identifier, a RAN sub-network preferably selected by the terminal device or a RAN sub-network that the terminal device intends to access.

The terminal device may simultaneously select a plurality of RAN sub-networks, so as to perform camping. In this case, the terminal device may separately use the cell selection/reselection method in the prior art for all the RAN sub-networks, and complete selection with reference to a service that the terminal device intends to support and availability information of the service. Different RAN sub-network instances in the RAN sub-networks selected by the terminal device may be located in different cells, different carriers, and different base stations.

In this embodiment of this application, the target RAN sub-network accessed by the terminal device may be determined by the terminal device based on a service requirement of the terminal device or another information, may be determined by the network side device for the terminal device based on a requirement of the terminal device and a network status after the terminal device sends information about a RAN sub-network required by the terminal device to the network side device, or certainly may be further determined by the network side device for the terminal device based on a network status. This is not limited in this application.

When the network side device determines a plurality of target RAN sub-networks for the terminal device, a measurement status of a neighboring cell of a RAN sub-network may be further considered. For example, when the target RAN sub-networks are determined, a target cell whose radio condition is best may be selected.

In this embodiment of this application, when the terminal device accesses the target RAN sub-network among the at least one RAN sub-network based on the service requirement of the terminal device, there may be a plurality of specific implementations. An implementation is: the terminal device first determines the target RAN sub-network based on the service requirement of the terminal device; then, the network side device connects the terminal device to the target RAN sub-network and a public RAN sub-network among other RAN sub-networks of the at least one RAN sub-network; and finally, the network side device redirects the terminal device to the target RAN sub-network from the public RAN sub-network.

The accessing, by the terminal device, the target RAN sub-network may be establishing a radio connection relationship between the terminal device and the RAN sub-network. For example, context information of the terminal device is generated in the RAN or the RAN sub-network, and the context information of the terminal device may include information such as an identifier of the terminal device, a radio bearer (radio bearer), or a radio resource configuration. Further, the terminal device establishes an association relationship with the core network by using the target RAN sub-network, for example, performs a registration and authentication process in the core network, or maintains status information and location information of the terminal device in the core network. The terminal device may access a target RAN sub-network by using a random access process, access a target RAN sub-network from a source RAN sub-network of a same base station, or access a target RAN sub-network of a target base station from a source RAN sub-network of a source base station.

Figure 5:
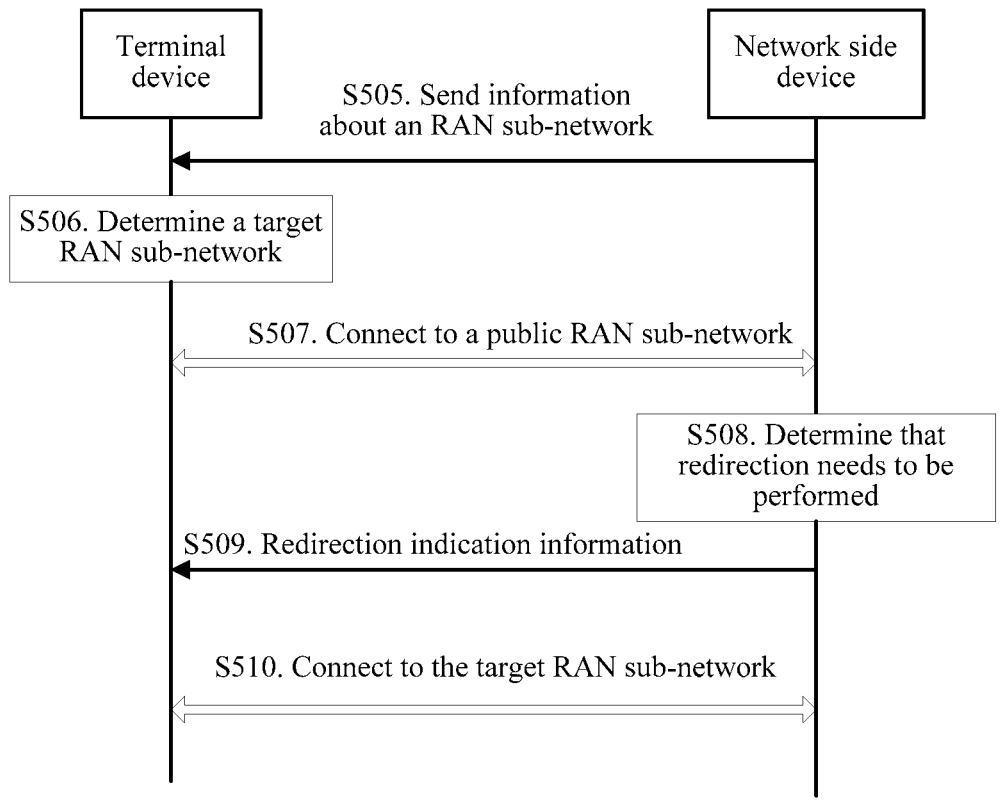
FIG. 5 is a schematic flowchart of a communication method according to an embodiment of this application.

How a terminal device accesses a target RAN sub-network by using a public RAN sub-network is described in detail below with reference to FIG. 5.

S505. A network side device sends sub-network information of a RAN sub-network in a RAN to a terminal device, and the terminal device receives the sub-network information.

S506. The terminal device determines a target RAN sub-network based on a requirement.

S507. Connect to the network side device by using the target RAN sub-network and a public RAN sub-network among other RAN sub-networks.

S508. The network side device determines that the terminal device needs to redirect to the target RAN sub-network.

S509. The network side device sends a redirection indication message to the terminal device.

S510. The terminal device accesses the target RAN sub-network, and communicates with the network side device.

In some application scenarios, when using respective specific radio network functions (Radio Network Function), the target RAN sub-network and the another RAN sub-network also use a common public RNF. For example, a multimedia broadcast multicast system (MBMS) may be used as a RAN sub-network, and the multimedia broadcast multicast system and a unicast (Unicast) service system share a primary synchronization signal (PSS) and a secondary synchronization signal (Secondary Synchronization Signal) of an air interface in a time division multiplexing (Time Division Multiplexing, TDM) manner.

In this case, after the terminal device is synchronized with the public RNF, the terminal device may redirect to a target RAN based on an indication of a master system information block (Master Information Block, MIB), based on an indication of the network side device (such as a base station) in a random access process, or based on an indication of the network side device (such as a base station or a mobility management network element) after the terminal device accesses the RAN by using the public RNF. An indication message of the MIB or the network side device may indicate a frequency to which the terminal device redirects, and an AI that is used to redirect to the target RAN sub-network. Redirection may be handover or reselection of the terminal device from a source RAN sub-network to a target RAN sub-network, context information of the terminal device in the source RAN sub-network may be stored or be not stored, and a connection relationship between the terminal device and the source RAN sub-network may be lost, or there is a connection relationship between the terminal device and each of the source RAN sub-network and the target RAN sub-network. When a connection relationship exists between the terminal device and each of a plurality of RAN sub-networks, the network side device may further indicate a primary RAN sub-network to the terminal device, and therefore another RAN sub-network is referred to as a secondary RAN sub-network. Positions of the primary RAN sub-network and the secondary RAN sub-network may be different. For example, the network side device maintains security information, RRC status information, and the like of the terminal device by using the primary RAN sub-network, and the terminal device receives system information, a paging message, and the like by using the primary RAN sub-network.

After the terminal device performs an RRC connection to the network side device by using the public RNF or the public RAN sub-network, the terminal device may not need to perform an RRC connection establishment process again when the terminal device accesses another RAN sub-network.

In some circumstances, a RAN sub-network has no synchronization signal, MIB, cell reference signal (Cell Reference Signal, CRS), or demodulation reference signal (Demodulation Reference Signal, DRS). In this case, the terminal device may redirect to the target RAN sub-network by using a synchronization signal, an MIB, a CRS, or a DRS of another RAN sub-network.

The terminal device may alternatively access the target RAN sub-network by scanning a synchronization signal of the target RAN sub-network. To be specific, the network side device connects the terminal device to the target RAN sub-network by using the synchronization signal of the target RAN sub-network. This manner is usually used for a situation in which a RAN sub-network not supporting a public RAN sub-network is accessed, or used for a situation in which the terminal device not within a coverage area of a public RAN sub-network accesses a target RAN sub-network.

One terminal device may access a plurality of RAN sub-networks, and the terminal device may add, delete, activate, or deactivate a RAN sub-network and/or a CN slice instance, or add, delete, activate, or deactivate a network slice based on a service requirement. For a terminal device that needs to access the plurality of RAN sub-networks, even if all the RAN sub-networks are independent, the terminal device may still perform downlink synchronization and downlink channel evaluation by detecting only some RAN sub-networks. For example, the plurality of RAN sub-networks use a public synchronization, access management, and mobility management function, the foregoing public function may be referred to as a public RAN sub-network or a public functional module. For example, all terminals having different service requirements may perform a downlink synchronization and RRC connection establishment process by using the public RAN sub-network, the slice controller configures a new RAN sub-network for UE based on a service requirement of the UE after access is successful, and the slice controller may configure a protocol function and resources that correspond to the new RAN sub-network for the UE by using a Radio Resource Control connection reconfiguration message. The network device establishes a plurality of radio bearers for the terminal, where different radio bearers are mapped to different RAN sub-networks, and transmission is performed by using resources of the different RAN sub-networks.

One RAN sub-network may also support a plurality of services. For example, the network device establishes a plurality of radio bearers for the terminal device, and service data in the plurality of radio bearers may be multiplexed (multiplexing) at a MAC layer of the network device or a MAC layer of the terminal device, and is transmitted by using a resource of the RAN sub-network.

When the terminal device accesses a plurality of RAN sub-networks, these RAN sub-networks may belong to different PLMNs and/or different mobility management network elements (MME), or may belong to a same PLMN and/or a same mobility management network element. The RAN sub-networks may use a uniform mobility management manner such as a shared public mobility management process and method, and additionally may further use different connection management, session management, security management processes and methods. For different RAN sub-networks, mobility management is a specific process of the terminal device, but connection management and session management are specific processes of the RAN sub-networks, and a security management process may be a specific process of an operator, a specific process of UE, or a specific process of the RAN sub-networks.

Specific mobility management of the terminal device may meet a mobility requirement of a service whose requirement is strictest. For example, tracking area update (Tracking Area Update, TAU) of only a RAN sub-network may be enabled, and the terminal device sends TAU based on a TA configuration of a RAN sub-network in which a tracking area (Tracking Area, TA) is minimum. For the terminal device in an RRC connection management state, a plurality of RAN slices may manage a mobility process of UE by using a same MME, for example, maintain an evolved packet core network mobility management (EMM, evolved packet system mobility management) state and an evolved packet core network connection management (ECM, evolved packet system connection management) state of the UE in the same MME. It should be understood that, different RAN sub-networks may also use respective mobility management policies. For example, a regional RAN sub-network uses a control plane and user plane anchor of the regional RAN sub-network, and when a terminal moves in the RAN sub-network, another RAN sub-network is not affected.

Because an area in which a terminal device moves is different from a coverage area of a RAN sub-network, a RAN sub-network may need to be added or deleted for the terminal device, and a RAN sub-network may be added or deleted for the terminal device by using an RRC connection reconfiguration process. Addition of a RAN sub-network or deletion of a RAN sub-network may be accompanied with a process of cell handover or RAN sub-network handover. a RAN sub-network may also be added or deleted for the terminal device because a service requirement changes, for example, a new service is added or an original service is deleted. It should be understood that, from the perspective of a terminal device, adding a RAN sub-network for the terminal device means that the terminal device may use a resource of the newly added RAN sub-network based on a configuration, and deleting a RAN sub-network for the terminal device means that the terminal device cannot continue to use a resource of the RAN sub-network; but from the perspective of a network device, a RAN sub-network newly added for the terminal device may be an existing RAN sub-network or a newly created RAN sub-network, and when a RAN sub-network is deleted for the terminal device, the network device may still reserve the RAN sub-network to be used for another terminal, or may delete the RAN sub-network, and consequently the RAN sub-network is not valid anymore. In this embodiment, an RRC connection reconfiguration message of an LTE system in the prior art is used as an example to describe addition or deletion of a RAN sub-network, or another message or a new message may be used to describe addition or deletion of a RAN sub-network. This is not limited in this application.

When a network side device (such as a base station) performs paging, a paging occasion and a sending manner usually need to be determined based on information about a service. In this case, consideration is made from the perspective of saving power of the terminal device.

When security management is specific to an operator, a plurality of RAN sub-networks that belong to the same operator and that are accessed by the terminal device may use a same security process such as a same message process, a same encryption algorithm, or a same key. Because different services need different security levels, different security processes may also be used for different RAN sub-networks. An authentication process when the terminal device attaches a RAN sub-network may be separately performed for different operators or different RAN sub-networks.

A session management process specific to a RAN sub-network includes a process such as establishment, modification, and deletion of a radio bearer, service continuity management, gateway selection, path handover caused by handover, or data forwarding. Different RAN sub-networks may be connected to different packet data networks (PDN) by using different gateways.

Additionally, in this embodiment of this application, when the terminal device accesses a plurality of RAN sub-networks, for management by these RAN sub-networks, the slice controller may designate a primary RAN sub-network to manage the terminal device. For example, the slice controller may select, based on one or more of information such as a requirement characteristic, a deployment scenario, and a capability attribute of each RAN sub-network, a capability of the terminal device, and subscription information of the terminal device, an appropriate RAN sub-network as a primary RAN sub-network to manage the terminal device, for example, perform session management, mobility management, and the like. Certainly, functions such as session management and mobility management may be divided, then a plurality of primary RAN sub-networks are designated, and functions obtained after division are managed by the different primary RAN sub-networks.

When the terminal device is managed by using a primary RAN sub-network, a public management policy on which the primary RAN sub-network depends may be provided by the slice controller. For example, the slice controller may form, based on one or more of information such as an attribute of each RAN sub-network, a service attribute in a RAN sub-network, and a category of the terminal device, a public management rule or policy, and then the primary RAN sub-network performs the public management rule or policy.

Figure 6:
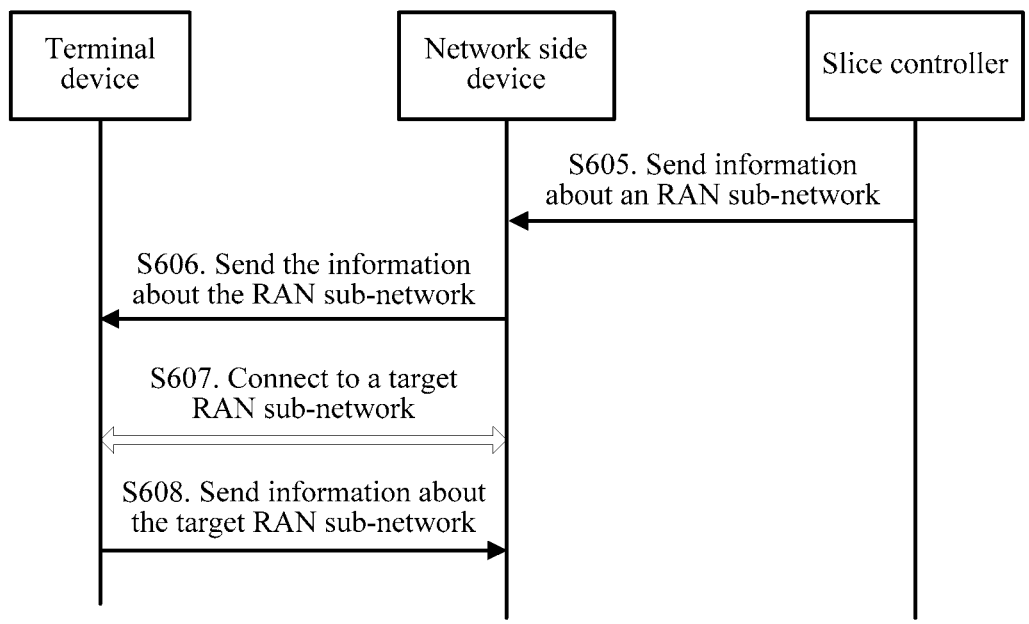
FIG. 6 is a schematic flowchart of a communication method according to an embodiment of this application.

FIG. 6 is a schematic flowchart of a communication method for configuring a RAN sub-network by a slice controller according to an embodiment this application.

S605. After configuring RAN sub-networks (which includes configuring a new RAN sub-network, updating a RAN sub-network, deleting a RAN sub-network, or the like), a slice controller sends sub-network information of the RAN sub-networks to a network side device. It should be noted that, the slice controller may also be deployed on the network side device.

S606. The network side device sends the sub-network information of the RAN sub-networks (which may include sub-network information of a RAN sub-network in a current cell or a neighboring cell) to a terminal device, for example, sends the sub-network information to the terminal device in a broadcast manner.

S607. After receiving the sub-network information of the RAN sub-networks, the terminal device may determine one or more target RAN sub-networks based on a requirement of the terminal device, and access the target RAN sub-network, to communicate with the network side device.

S608. The terminal device sends information about the target RAN sub-network to the network side device, so that the network side device connects the terminal device to the target RAN sub-network based on the information. The terminal device may send the information about the target RAN sub-network to the network side device when initial access is performed, when the requirement of the terminal device changes, or after handover (handover) or Radio Resource Control connection re-establishment (radio resource control connection re-establishment).

The method for configuring a RAN sub-network and the communication method according to the embodiments of this application are described above with reference to FIG. 2 to FIG. 6, and a slice controller, a terminal device, and a network side device according to the embodiments of this application are described below with reference to FIG. 7 to FIG. 12.

Figure 7:
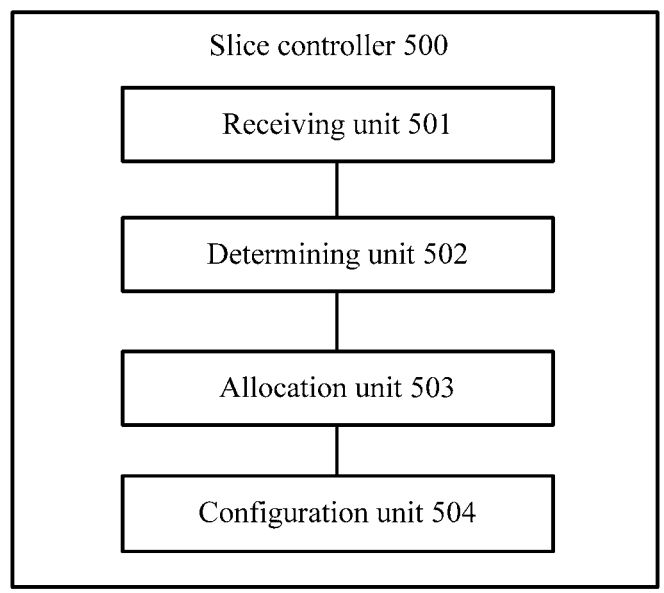
FIG. 7 is a schematic structural diagram of a slice controller according to an embodiment of this application.

FIG. 7 is a schematic structural diagram of a slice controller 500 according to an embodiment of this application. It should be understood that, the slice controller 500 in FIG. 7 can implement each step in FIG. 2, and can also implement a step performed by the slice controller in FIG. 6. For brevity, repetitive descriptions are appropriately omitted. The slice controller 500 includes:

a receiving unit 501, configured to receive a request message, where the request message is used to request the slice controller to configure a first RAN sub-network satisfying a target communication service requirement;

a determining unit 502, configured to determine, based on the target communication service requirement, at least one protocol function and air interface format that correspond to the first RAN sub-network;

an allocation unit 503, configured to allocate, radio resources to the first RAN sub-network based on the target communication service requirement; and a configuration unit 504, configured to configure the first RAN sub-network based on the protocol function, the air interface format, and the radio resources.

The slice controller configures the RAN sub-network that includes the protocol function, the air interface format, and the radio resources, so that subsequent communication related to the RAN sub-network can be implemented.

Optionally, in an embodiment, the determining unit 502 is specifically configured to select a target protocol function applicable to the target communication service requirement from a plurality of candidate protocol functions, and select a target air interface format applicable to the target communication service requirement from a plurality of candidate air interface formats; and determine the target protocol function and the target air interface format as a protocol function and an air interface format that correspond to the first RAN sub-network.

Optionally, in an embodiment, the first RAN sub-network is any one of a plurality of RAN sub-networks configured by the slice controller, and the radio resources of the first RAN sub-network include radio resources exclusively occupied by the first RAN sub-network and radio resources shared by the first RAN sub-network and another one of the plurality of RAN sub-networks.

Optionally, in an embodiment, the radio resources of the first RAN sub-network are all radio resources exclusively occupied by the first RAN sub-network.

Optionally, in an embodiment, the first RAN sub-network is any one of a plurality of RAN sub-networks configured by the slice controller, and the first RAN sub-network and another one of the plurality of RAN sub-networks share a scheduling function in the protocol function.

Optionally, in an embodiment, the first RAN sub-network and another sub-network in the plurality of RAN sub-networks configured by the slice controller correspond to a same CN sub-network in a CN, and the first RAN sub-network and the another sub-network in the plurality of RAN sub-networks form a network slice satisfying the target communication service requirement.

Optionally, in an embodiment, the first RAN sub-network corresponds to one or more CN sub-networks in a CN, and the first RAN sub-network and the one or more CN sub-networks form a network slice satisfying the target communication service requirement.

Optionally, in an embodiment, the slice controller further includes an adjustment unit, configured to adjust, based on a usage status of the radio resources of the first RAN sub-network or a change in the target communication service requirement, at least one of the protocol function, the air interface format, and the radio resources that correspond to the first RAN sub-network.

Optionally, in an embodiment, the slice controller receives status information of a network slice consisting of the first RAN sub-network sent by the CN, where the adjusting, by the slice controller based on a usage status of the radio resources of the first RAN sub-network or a change in the target communication service requirement, at least one of the protocol function, the air interface format, and the radio resources that correspond to the first RAN sub-network includes: adjusting, by the slice controller based on the status information and the usage status of the radio resources of the first RAN sub-network or the change in the target communication service requirement, at least one of the protocol function, the air interface format, and the radio resources that correspond to the first RAN sub-network.

Optionally, in an embodiment, the method further includes: sending, by the slice controller, information about the at least one protocol function and air interface format, and the radio resources that correspond to the first RAN sub-network.

Figure 8:
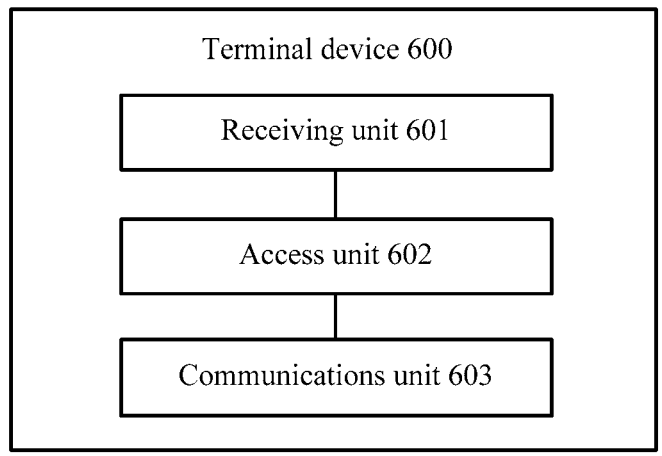
FIG. 8 is a schematic structural diagram of a terminal device according to an embodiment of this application.

FIG. 8 is a schematic structural diagram of a terminal device 600 according to an embodiment of this application. It should be understood that, the terminal device 600 in FIG. 8 can implement each step performed by the terminal device in FIG. 3 to FIG. 6. For brevity, repetitive descriptions are appropriately omitted. The terminal device 600 includes:

a receiving unit 601, configured to receive sub-network information of a RAN sent by a network side device, where the sub-network information is used to indicate at least one RAN sub-network included in the RAN;

an access unit 602, configured to access a target RAN sub-network among the at least one RAN sub-network based on a service requirement of the terminal device; and a communications unit 603, configured to communicate with the network side device by using the target RAN sub-network.

By receiving information about a RAN sub-network sent by the network side device, the terminal device 600 can access a target RAN sub-network among the RAN sub-network, to implement communication between the terminal device and the network side device by using the RAN sub-network.

Optionally, in an embodiment, the access unit 602 is specifically configured to determine the target RAN sub-network based on the service requirement of the terminal device 600; access a public RAN sub-network among the at least one RAN sub-network; and redirect to the target RAN sub-network from the public RAN sub-network.

Optionally, in an embodiment, the access unit 602 is specifically configured to determine the target RAN sub-network based on the service requirement of the terminal device 600; detect a synchronization signal of the target RAN sub-network; and access the target RAN sub-network based on the synchronization signal.

Optionally, in an embodiment, slice information of the at least one RAN sub-network includes at least one of the following information of each of the at least one RAN sub-network: information about a supported PLMN, a supported service type, information about a public land mobile network PLMN supported by a neighboring RAN sub-network, and a service type supported by the neighboring RAN sub-network.

Optionally, in an embodiment, the target RAN sub-network includes a plurality of RAN sub-networks, the plurality of RAN sub-networks respectively belong to a plurality of network slices, and the plurality of network slices use a uniform mobility management manner for the terminal device 600.

Figure 9:
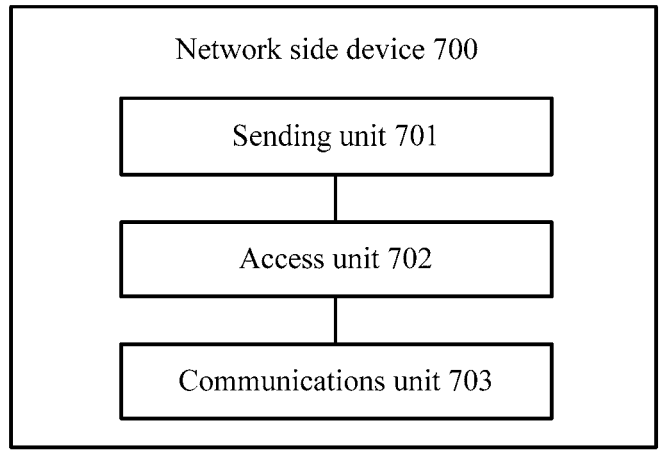
FIG. 9 is a schematic structural diagram of a network side device according to an embodiment of this application.

FIG. 9 is a schematic structural diagram of a network side device 700 according to an embodiment of this application. It should be understood that, the network side device 700 in FIG. 9 can implement the method performed by the network side device in FIG. 3 to FIG. 6. For brevity, repetitive descriptions are appropriately omitted. The network side device 700 includes:

a sending unit 701, configured to send sub-network information of a RAN to a terminal device, where the sub-network information is used to indicate at least one RAN sub-network included in the RAN;

an access unit 702, configured to connect the terminal device to a target RAN sub-network among the at least one RAN sub-network, where the target RAN is selected based on a service requirement of the terminal device; and a communications unit 703, configured to communicate with the terminal device by using the target RAN sub-network.

By sending information about a RAN sub-network to the terminal device, the network side device can implement communication between the terminal device and the network side device by using the RAN sub-network.

Optionally, in an embodiment, the access unit 702 is specifically configured to connect the terminal device to a public RAN sub-network among the at least one RAN sub-network, and obtain information about the target RAN sub-network from the terminal device; and redirect, based on the information about the target RAN sub-network, the terminal device to the target RAN sub-network from the public RAN sub-network.

Optionally, in an embodiment, the network side device 700 further includes a handover unit, configured to: when the service requirement of the terminal device or a RAN sub-network that the terminal device intends to access changes, hand the terminal device over to a new RAN sub-network.

Optionally, in an embodiment, the slice information includes at least one of the following information of each of the at least one RAN sub-network: information about a supported PLMN, a supported service type, information about a PLMN supported by a neighboring RAN sub-network, and a service type supported by the neighboring RAN sub-network.

Optionally, in an embodiment, the target RAN sub-network includes a plurality of RAN sub-networks, the plurality of RAN sub-networks respectively belong to a plurality of network slices, and the plurality of network slices use a uniform mobility management manner for the terminal device.

Figure 10:
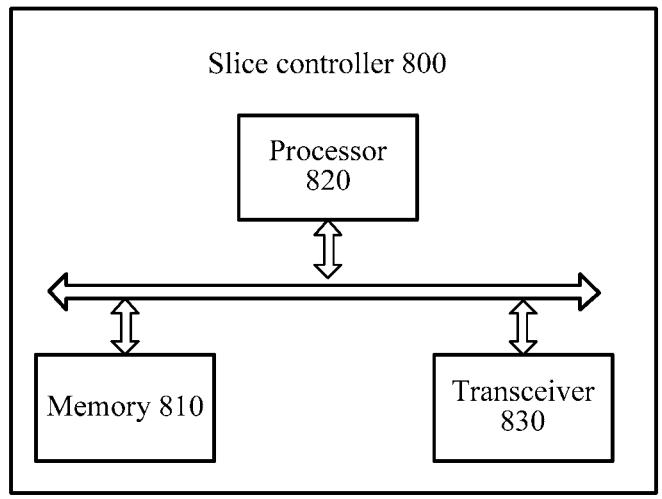
FIG. 10 is a schematic structural diagram of a slice controller according to an embodiment of this application.

FIG. 10 is a schematic structural diagram of a slice controller 800 according to an embodiment of this application. It should be understood that, the slice controller 800 in FIG. 10 can implement each step in FIG. 2, and can also implement a step performed by the slice controller in FIG. 6. For brevity, repetitive descriptions are appropriately omitted. The slice controller 800 includes:

a memory 810, configured to store a program;

a transceiver 830, configured to receive a request message, where the request message is used to request the slice controller to configure a first RAN sub-network satisfying a target communication service requirement; and a processor 820, configured to: execute the program in the memory 810, and when the program is executed, determine, based on the target communication service requirement, a protocol function and an air interface format that correspond to the first RAN sub-network; allocate radio resources to the first RAN sub-network based on the target communication service requirement; and configure the first RAN sub-network based on the protocol function, the air interface format, and the radio resources.

The slice controller configures the RAN sub-network that includes the protocol function, the air interface format, and the radio resources, so that subsequent communication related to the RAN sub-network can be implemented.

Figure 11:
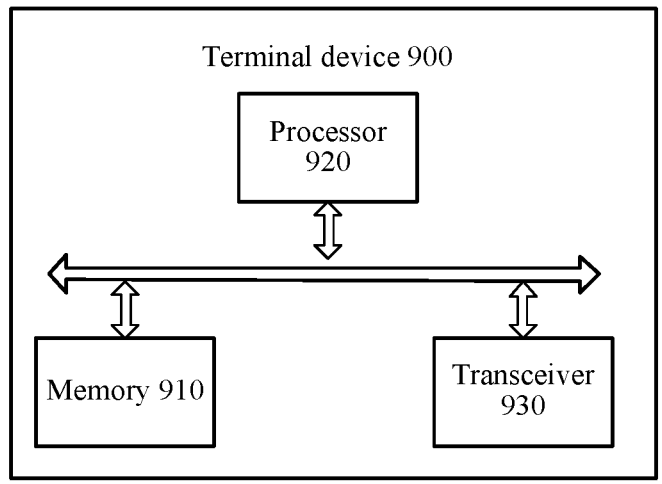
FIG. 11 is a schematic structural diagram of a terminal device according to an embodiment of this application.

FIG. 11 is a schematic structural diagram of a terminal device 900 according to an embodiment of this application. It should be understood that, the terminal device 900 in FIG. 11 can implement each step performed by the terminal device in FIG. 3 to FIG. 6. For brevity, repetitive descriptions are appropriately omitted. The terminal device 900 includes:

a memory 910, configured to store a program;

a transceiver 930, configured to receive sub-network information of a RAN sent by a network side device, where the sub-network information is used to indicate at least one RAN sub-network included in the RAN; and a processor 920, configured to: execute the program in the memory 910, and when the program is executed, the processor 920 accesses a target RAN sub-network among the at least one RAN sub-network based on a service requirement of the terminal device; and communicate with the network side device by using the target RAN sub-network.

By receiving information about a RAN sub-network sent by the network side device, the terminal device can access a target RAN sub-network among the RAN sub-network, to implement communication between the terminal device and the network side device by using the RAN sub-network.

Figure 12:
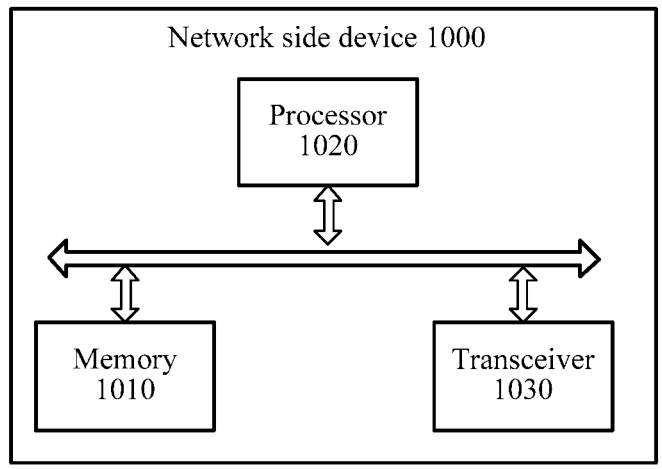
FIG. 12 is a schematic structural diagram of a network side device according to an embodiment of this application.

FIG. 12 is a schematic structural diagram of a network side device 1000 according to an embodiment of this application. It should be understood that, the network side device 1000 in FIG. 12 can implement the method performed by the network side device in FIG. 3 to FIG. 6. For brevity, repetitive descriptions are appropriately omitted. The network side device 1000 includes:

a memory 1010, configured to store a program;

a transceiver 1030, configured to send sub-network information of a RAN to a terminal device, where the sub-network information is used to indicate at least one RAN sub-network included in the RAN; and a processor 1020, configured to connect the terminal device to a target RAN sub-network among the at least one RAN sub-network, where the target RAN is selected based on a service requirement of the terminal device; and communicate with the terminal device by using the target RAN sub-network.

By sending information about a RAN sub-network to the terminal device, the network side device can implement communication between the terminal device and the network side device by using the RAN sub-network.

Figure 13:
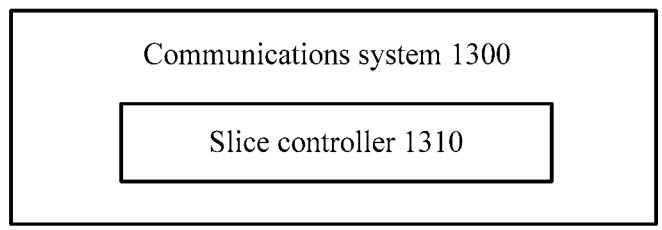
FIG. 13 is a schematic structural diagram of a communications system according to an embodiment of this application.

FIG. 13 is a schematic structural diagram of a communications system 1300 according to an embodiment of this application. The communications system 1300 includes a slice controller 1310. The slice controller 1310 may be the slice controller 500 in FIG. 7.

Figure 14:
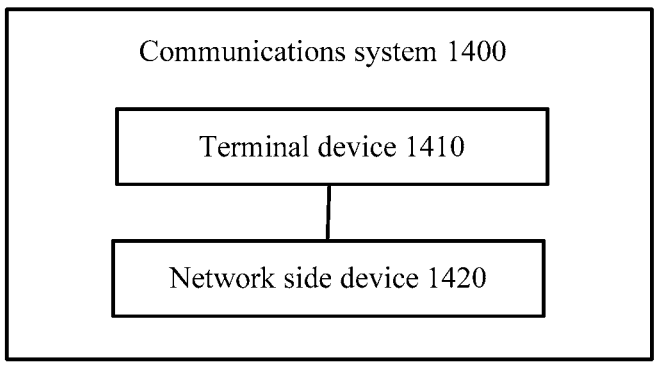
FIG. 14 is a schematic structural diagram of a communications system according to an embodiment of this application.

FIG. 14 is a schematic structural diagram of a communications system 1400 according to an embodiment of this application. The communications system 1400 includes a terminal device 1410 and a network side device 1420. The terminal device 1410 may be the terminal device 600 in FIG. 8, and the network side device 1420 may be the network side device 700 in FIG. 7.

Figure 15:
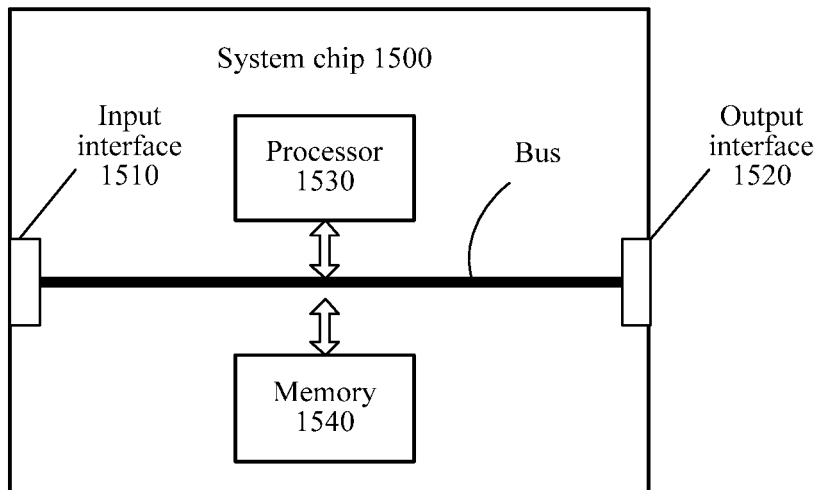
FIG. 15 is a schematic structural diagram of a system chip according to an embodiment of this application.

FIG. 15 is a schematic structural diagram of a system chip according to an embodiment of this application. The system chip 1500 in FIG. 15 includes an input interface 1510, an output interface 1520, at least one processor 1530, and a memory 1540. The input interface 1510, the output interface 1520, the processor 1530, and the memory 1540 are connected to each other by using a bus, the processor 1530 is configured to execute code in the memory 1540, and when the code is executed, the processor 1530 implements the method performed by the slice controller in FIG. 2.

Figure 16:
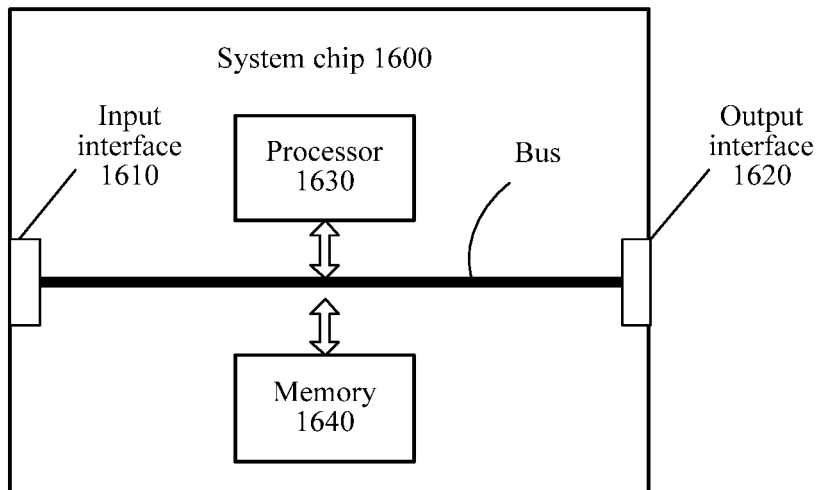
FIG. 16 is a schematic structural diagram of a system chip according to an embodiment of this application.

FIG. 16 is a schematic structural diagram of a system chip according to an embodiment of this application. The system chip 1600 in FIG. 16 includes an input interface 1610, an output interface 1620, at least one processor 1630, and a memory 1640. The input interface 1610, the output interface 1620, the processor 1630, and the memory 1640 are connected to each other by using a bus, the processor 1630 is configured to execute code in the memory 1640, and when the code is executed, the processor 1630 implements the method performed by the terminal device in FIG. 3 or FIG. 4.

Figure 17:
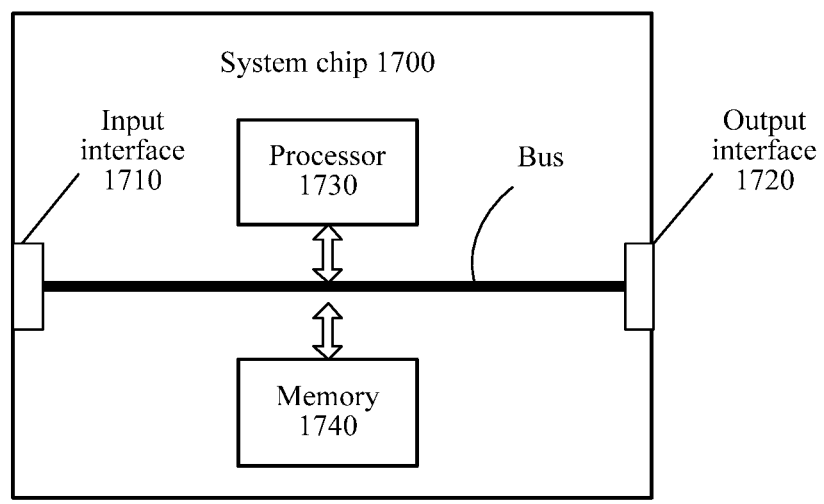
FIG. 17 is a schematic structural diagram of a system chip according to an embodiment of this application.

FIG. 17 is a schematic structural diagram of a system chip according to an embodiment of this application. The system chip 1700 in FIG. 17 includes an input interface 1710, an output interface 1720, at least one processor 1730, and a memory 1740. The input interface 1710, the output interface 1720, the processor 1730, and the memory 1740 are connected to each other by using a bus, the processor 1730 is configured to execute code in the memory 1740, and when the code is executed, the processor 1730 implements the method performed by the network side device in FIG. 3 or FIG. 4.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on specific applications and design constraint conditions of the technical solutions. A person skilled in the art may use different methods to implement the described functions for each specific application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
obtaining, by a terminal device from a radio access network (RAN), availability information of a service supported by a first sub-network;
selecting, by the terminal device, the first sub-network as a target sub-network for forming a network slice among at least one sub-networks of the RAN based on the availability information of the service supported by the first sub-network;
accessing, by the terminal device, the target sub-network based on a service requirement of the terminal device; and
communicating, by the terminal device, with a network side device by using the target RAN sub-network, wherein a plurality of RAN sub-networks accessed by the terminal device comprise the target RAN sub-network, wherein a plurality of radio bearers established for the terminal device are mapped to the plurality of RAN sub-networks respectively, wherein the target RAN sub-network corresponds to a core-net (CN) sub-network, wherein the target RAN sub-network and the CN sub-network form the network slice that satisfies the service requirement, wherein the plurality of RAN sub-networks correspond to a plurality of CN sub-networks respectively, wherein the plurality of RAN sub-networks and the plurality of CN sub-networks form a plurality of network slices respectively, wherein the plurality of network slices use a uniform mobility management manner for the terminal device, wherein the uniform mobility management manner comprises a uniform mobility management function for a plurality of terminal devices, wherein the target RAN sub-network comprises at least one of the following: a physical layer protocol layer, a media access control protocol layer, a radio link control protocol layer, or a packet data convergence protocol layer, and wherein the RAN sub-network shares one or more of the following functions with other RAN sub-network: a scheduling function of a MAC layer protocol, a function of multiplexing, a function of demultiplexing, a function of random access, a function of HARQ control, or a function of logical channel prioritization;
wherein the accessing, by the terminal device, the target sub-network based on the service requirement of the terminal device includes:
determining, by the terminal device, the target sub-network based on the service requirement;
detecting, by the terminal device, a synchronization signal of the target sub-network; and
accessing, by the terminal device, the target sub-network based on the synchronization signal.

2. An apparatus applied for a terminal device, comprising:
at least one processor; and
a memory storing instructions, wherein the instructions instruct the at least one processor to perform operations comprising:
obtaining from a radio access network (RAN), availability information of a service supported by a first sub-network;
selecting the first sub-network as a target sub-network for forming a network slice among at least one sub-networks of the RAN based on the availability information of the service supported by the first sub-network;
accessing, the target sub-network based on a service requirement of the terminal device; and
communicating with a network side device by using the target RAN sub-network, wherein a plurality of RAN sub-networks accessed by the terminal device comprise the target RAN sub-network, wherein a plurality of radio bearers established for the terminal device are mapped to the plurality of RAN sub-networks respectively, wherein the target RAN sub-network corresponds to a core-net (CN) sub-network, wherein the target RAN sub-network and the CN sub-network form the network slice that satisfies the service requirement, wherein the plurality of RAN sub-networks correspond to a plurality of CN sub-networks respectively, wherein the plurality of RAN sub-networks and the plurality of CN sub-networks form a plurality of network slices respectively, wherein the plurality of network slices use a uniform mobility management manner for the terminal device, wherein the uniform mobility management manner comprises a uniform mobility management function for a plurality of terminal devices, wherein the target RAN sub-network comprises at least one of the following: a physical layer protocol layer, a media access control protocol layer, a radio link control protocol layer, or a packet data convergence protocol layer, and wherein the target RAN sub-network shares one or more of the following functions with other RAN sub-network: a scheduling function of a MAC layer protocol, a function of multiplexing, a function of demultiplexing, a function of random access, a function of HARQ control, or a function of logical channel prioritization;
wherein the accessing the target sub-network based on a service requirement of the terminal device includes:
determining the target sub-network based on the service requirement;
detecting a synchronization signal of the target sub-network; and
accessing the target sub-network based on the synchronization signal.

3. A communication method, comprising:
providing, by a radio access network (RAN), availability information of a service supported by a first sub-network to a terminal device, wherein the availability information is used for selecting the first sub-network as a target sub-network for forming a network slice among at least one sub-networks of the RAN,
wherein the target RAN sub-network is determined based on the service requirement, and the target RAN sub-network is accessed based on a synchronization signal of the target RAN sub-network; and
communicating, by the RAN, with the terminal device via the target sub-network that is accessed by the terminal device, wherein a plurality of RAN sub-networks accessed by the terminal device comprise the target RAN sub-network, wherein a plurality of radio bearers established for the terminal device are mapped to the plurality of RAN sub-networks respectively, wherein the target RAN sub-network corresponds to a core-net (CN) sub-network, wherein the target RAN sub-network and the CN sub-network form the network slice that satisfies the service requirement, wherein the plurality of RAN sub-networks correspond to a plurality of CN sub-networks respectively, wherein the plurality of RAN sub-networks and the plurality of CN sub-networks form a plurality of network slices respectively, wherein the plurality of network slices use a uniform mobility management manner for the terminal device, wherein the uniform mobility management manner comprises a uniform mobility management function for a plurality of terminal devices, wherein the target RAN sub-network comprises at least one of the following: a physical layer protocol layer, a media access control protocol layer, a radio link control protocol layer, or a packet data convergence protocol layer, and wherein the target RAN sub-network shares one or more of the following functions with other RAN sub-network: a scheduling function of a MAC layer protocol, a function of multiplexing, a function of demultiplexing, a function of random access, a function of HARQ control, or a function of logical channel prioritization.

4. An apparatus applied for a radio access network (RAN), comprising:
   at least one processor; and
   a memory storing instructions, wherein the instructions instruct the at least one processor to perform operations comprising:
   providing, availability information of a service supported by a first sub-network to a terminal device, wherein the availability information is used for selecting the first sub-network as a target sub-network for forming a network slice among at least one sub-networks of the RAN,
   wherein the target RAN sub-network is determined based on the service requirement, and the target RAN sub-network is accessed based on a synchronization signal of the target RAN sub-network; and
   communicating, with the terminal device via the target sub-network that is accessed by the terminal device, wherein a plurality of RAN sub-networks accessed by the terminal device comprise the target RAN sub-network, wherein a plurality of radio bearers established for the terminal device are mapped to the plurality of RAN sub-networks respectively, wherein the target RAN sub-network corresponds to a core-net (CN) sub-network, wherein the target RAN sub-network and the CN sub-network form the network slice that satisfies the service requirement, wherein the plurality of RAN sub-networks correspond to a plurality of CN sub-networks respectively, wherein the plurality of RAN sub-networks and the plurality of CN sub-networks form a plurality of network slices respectively, wherein the plurality of network slices use a uniform mobility management manner for the terminal device, wherein the uniform mobility management manner comprises a uniform mobility management function for a plurality of terminal devices, wherein the target RAN sub-network comprises at least one of the following: a physical layer protocol layer, a media access control protocol layer, a radio link control protocol layer, or a packet data convergence protocol layer, and wherein the target RAN sub-network shares one or more of the following functions with other RAN sub-network: a scheduling function of a MAC layer protocol, a function of multiplexing, a function of demultiplexing, a function of random access, a function of HARQ control, or a function of logical channel prioritization.

* * * * *